United States Patent [19]

Yagi et al.

[11] Patent Number: 4,745,956
[45] Date of Patent: May 24, 1988

[54] PNEUMATIC TIRES WITH SPECIFIED BELT CORD PROPERTIES

[75] Inventors: Akira Yagi, Suginami; Tatsuro Shimada, Musashimurayama; Kazuomi Kobayashi, Kodaira, all of Japan

[73] Assignee: Bridgestone Corporation, Tokyo, Japan

[21] Appl. No.: 708,476

[22] Filed: Mar. 5, 1985

[30] Foreign Application Priority Data

Mar. 5, 1984 [JP] Japan ................................. 59-40534

[51] Int. Cl.$^4$ .......................... D02G 3/48; B60C 9/20
[52] U.S. Cl. ..................................... 152/527; 152/531
[58] Field of Search .............. 152/451, 527, 531, 538; 57/902

[56] References Cited

U.S. PATENT DOCUMENTS

| | | | |
|---|---|---|---|
| 3,090,189 | 5/1963 | Boussu et al. ........................ | 57/139 |
| 3,090,190 | 5/1963 | Boussu et al. ........................ | 57/139 |
| 3,667,527 | 6/1972 | Magistrini et al. .............. | 152/531 X |
| 4,169,495 | 10/1979 | Maiocchi ........................... | 152/361 R |
| 4,214,620 | 7/1980 | Mezzanotte . | |
| 4,216,813 | 8/1980 | Kersker ....................... | 152/361 DM |
| 4,234,031 | 11/1980 | Pommier ............................. | 152/527 |
| 4,235,274 | 11/1980 | Suzuki et al. ...................... | 152/527 |
| 4,284,117 | 8/1981 | Poque et al. ........................ | 152/527 |
| 4,506,718 | 3/1985 | Abe et al. ....................... | 152/354 R |

*Primary Examiner*—Donald E. Czaja
*Assistant Examiner*—Geoffrey L. Knable
*Attorney, Agent, or Firm*—Sughrue, Mion, Zinn, Macpeak & Seas

[57] ABSTRACT

A pneumatic tire for use in passenger cars is disclosed, which comprises a carcass as a reinforcement for a tire casing and a belt composed of two parallel-arranged belt layers each containing steel cords therein, the cords of which layers being crossed with each other with respect to the mid-circumferential line of the tire. In this tire, the belt is composed of a combination of a rubberized layer containing flexible and stretchable steel cords of strand construction in the same direction, each cord having a bending resistance of $5 \sim 1.4$ gf/mm as a ratio of load to unit deflection under loading in three-point bending test and an elongation under a load of 3 kgf of $0.5 \sim 2\%$ in tension test, and a layer and/or a cap composed of textile cords surrounding an outer periphery of each of at least both side ends of the rubberized layer.

7 Claims, 4 Drawing Sheets

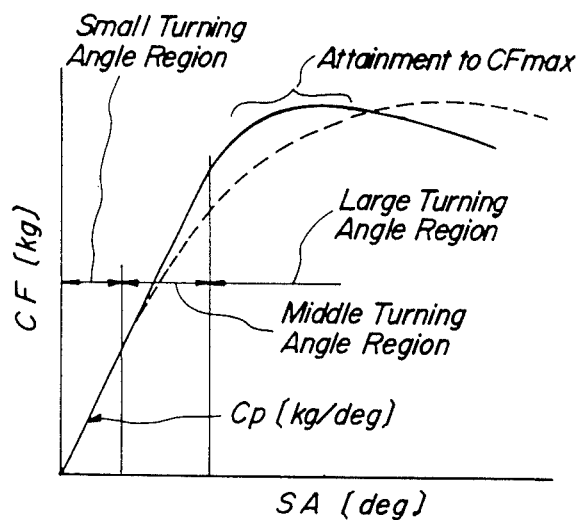
FIG_1
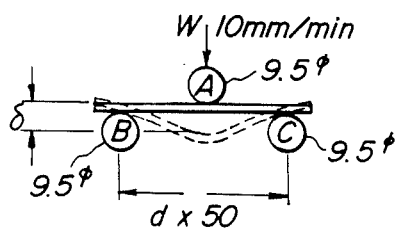
FIG_2
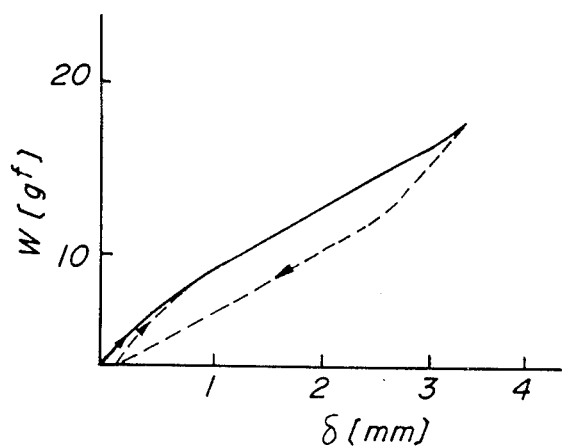
FIG_3

PNEUMATIC TIRES WITH SPECIFIED BELT CORD PROPERTIES

BACKGROUND OF THE INVENTION

1. Field of the Invention

This invention relates to a pneumatic tire for use in four-wheeled vehicles exclusively carrying persons other than goods and cargo, which are known as passenger cars, more particularly this invention relates to an improvement of the cornering stability in this type of the pneumatic tire for passenger cars using a belt composed of steel cords.

2. Description of the Prior Art

In the pneumatic tire comprising a carcass as a reinforcement for a tire casing and a belt composed of two parallel-arranged belt layers each containing steel cords therein, the cords of the layers are crossed with each other with respect to the mid-circumferential line of the tire. The rigidity of the belt is usually high and the cornering stability is excellent over a region extending from a small turning angle to middle turning angle because when a slip angle (hereinafter abbreviated as SA) is given during the running of the tire, the deformation of the belt is small and hence the cornering power (hereinafter abbreviated as Cp) at the small turning angle is large.

However, as Cp becomes larger, the attainment of cornering force (hereinafter abbreviated as CF) to an uppermost peak at a higher SA increases. Hence, the rapid change of CF over a region extending from middle turning angle to large turning angle deteriorates the cornering stability, which is still involved in the tire.

SUMMARY OF THE INVENTION

It is, therefore, an object of the invention to provide a pneumatic tire for use in passenger cars capable of maintaining appropriate cornering stability over a whole region extending from small turning angle to large turning angle by improving the belt structure so as to delay the attainment to maximum CF on SA without largely decreasing the value of Cp.

According to the invention, there is provided a pneumatic tire for use in passenger cars comprising a carcass as a reinforcement for a tire casing and a belt composed of two parallel-arranged belt layers each containing steel cords therein, the cords of which layers being crossed with each other with respect to the mid-circumferential line of the tire. In accordance with the invention the belt is composed of a combination of a rubberized layer containing flexible and stretchable steel cords of strand construction twisted in the same direction, each cord having a bending resistance of $5 \sim 1.4$ gf/mm as a ratio of load to unit deflection under loading in a three-point bending test and an elongation under a load of 3 kgf of $0.5 \sim 2\%$ in tension test, and a layer and/or a cap composed of textile cords surrounding an outer periphery of each of at least both side ends of the rubberized layer.

BRIEF DESCRIPTION OF THE DRAWINGS

The invention will be described with reference to the accompanying drawings, wherein:

FIG. 1 is a graph showing a relation between CF and SA;

FIG. 2 is a diagrammatic view illustrating an outline of a test for bending resistance;

FIG. 3 is a graph showing a result on the bending resistance;

DESCRIPTION OF THE PREFERRED EMBODIMENTS

FIG. 1 illustrates an example of SA-CF curve by a solid line. When a Cp level represented by a gradient of the solid line at the small slip angle area is high, the uppermost peak of CF is attained early to cause rapid change of transverse force near CF max. Therefore, when a certain turning angle is given to the tire, the rapid behavior is brought about in the moving performance of the vehicle.

For this reason, it is necessary to maintain the cornering stability over a region extending from small turning angle to large turning angle or provide the high value of SA at CF max by making SA at CF max higher while keeping high Cp level to obtain SA-CF curve for preventing a rapid change of transverse force as shown by a broken line.

For this purpose, it is important that the bending resistance of the steel cord used in the belt is reduced and the stretchability thereof is made high, whereby the deformation of the tire tread when being subjected to SA is facilitated to hold the adhesion zone against road surface and suppress dropping of Cp level accompanied with the reduction of the belt rigidity.

The above demands on bending resistance and stretchability of the steel cord are achieved by the use of steel cord with a strand construction in the same direction such as $3 \times 7$ twisting construction satisfying a bending resistance of $5 \sim 1.4$ gf/mm as a ratio of load to unit deflection under loading in a three-point bending test and an elongation under a load of 3 kgf of $0.5 \sim 2\%$ in tension test. This is different from the conventional steel cord for use in the belt having a so-called layer construction such as $1 \times 5$ construction. Further, the belt should be a combination with a layer and/or a cap surrounding an outer periphery of each of at least both side ends of the steel cord layer in order to hold the required Cp level.

In the three-point bending test, as shown in FIG. 2, a steel cord to be tested extends between a pair of supports B, C with a circular section of 9.5 mm in outer diameter fixed at a distance corresponding to 50 times the diameter of the cord. The cord is subjected to a bending deformation by applying a loading tool A with a circular section of 9.5 mm in outer diameter to the middle of the cord at a moving speed of 10 mm/min, from which is measured in relation between load and deflection as shown in FIG. 3. The gradient of the straight line shown by a solid line of FIG. 3, i.e. ratio of load to unit deflection is expressed as the bending resistance. According to the invention, the bending resistance is within a range of 5 gf/mm $\sim$ 1.4 gf/mm.

Figure 4:
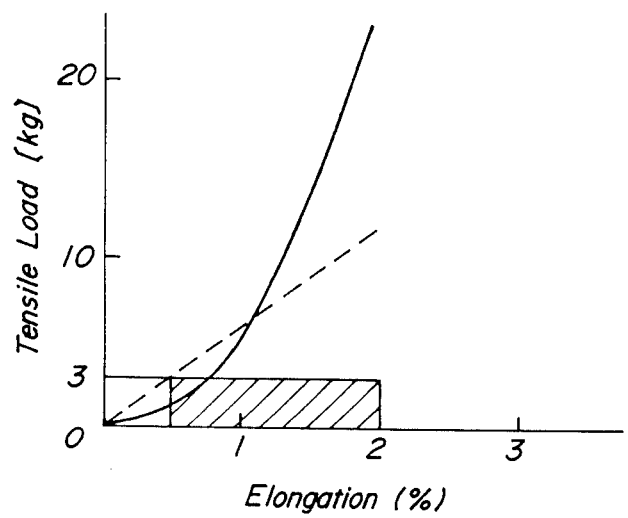
FIG. 4 is a graph showing a relation between tensile load and elongation.

In the tension test, a tensile load is applied to the test cord having a gauge length of 200 mm to measure an elongation expressed as a ratio of elongated part to gauge length. According to the invention, the steel cord has such a stretchability that the elongation under a tensile load of 3 kgf is within a range of 0.5~2% as shown by a solid line in FIG. 4.

Figure 5:
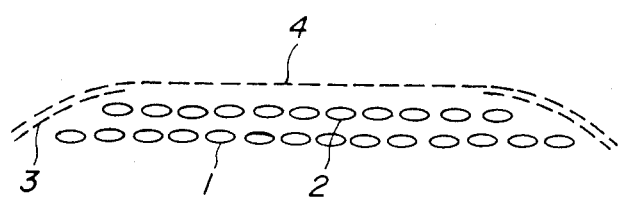
FIG. 5 is a schematic view of the belt structure.

FIG. 5 illustrates an example in the combination of the two parallel-arranged belt layers of steel cords with a layer and/or a cap as the belt, wherein the belt layers 1, 2 are laminated one upon the other at stepwise difference while being freely left at both ends thereof. The layer 3 and the cap 4 are composed of proper textile cords such as nylon cords or the like, respectively.

These layers 3 and cap 4 are indispensable as a reinforcement for the belt, which contribute to hold the desired Cp level in spite of the reduction of the belt rigidity.

Figure 6:
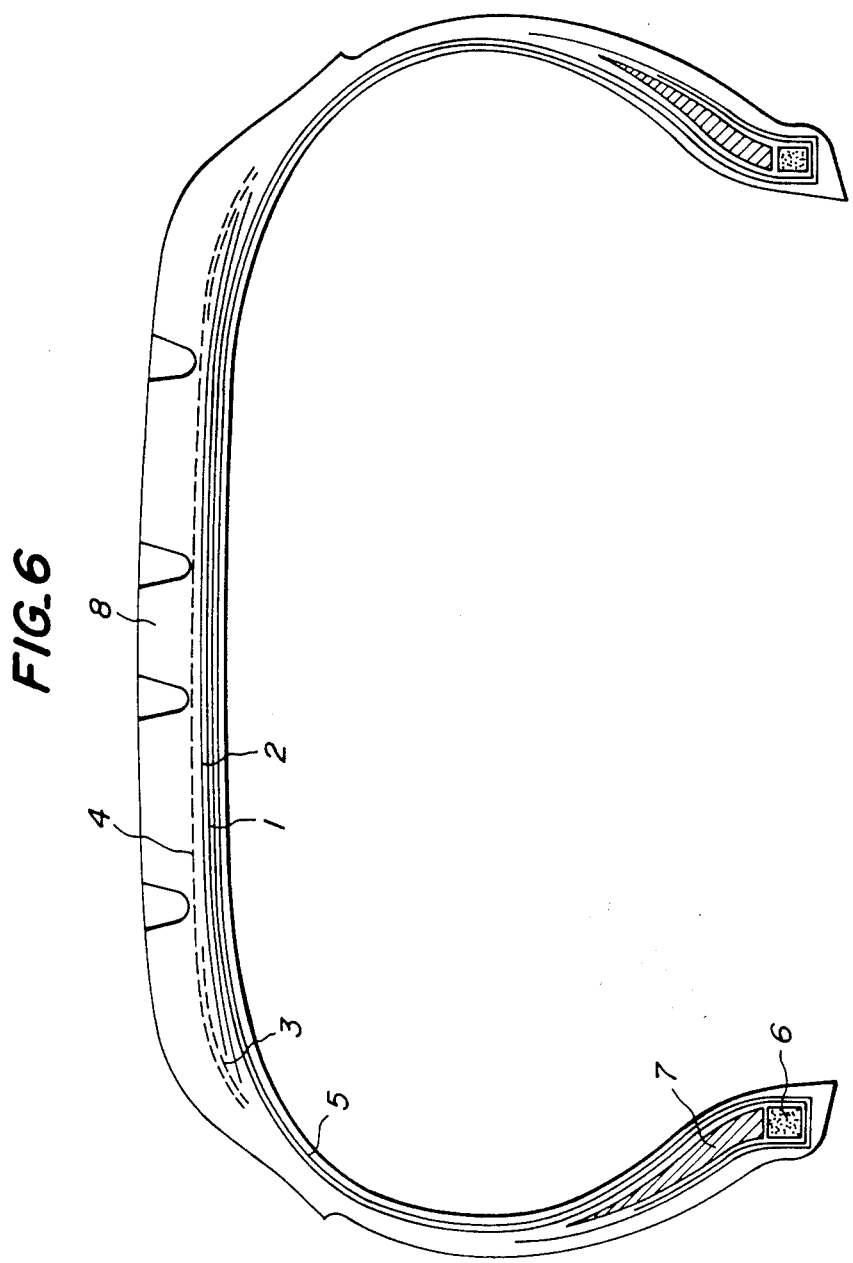
FIG. 6 is a diagrammatically sectional view of an embodiment of the pneumatic tire according to the invention.

In FIG. 6 an embodiment of the pneumatic tire according to the invention is illustrated having a tire size of 215/60 VR 15, wherein numerals 1 and 2 are belt layers of steel cords, numerals 3 and 4 are layers and a cap of nylon cords, numeral 5 a carcass, numeral 6 a bead core, numeral 7 a bead filler, and numeral 8 a tread rubber.

In each of the belt layers 1 and 2, steel cords with strand construction of 3×7×0.15 mm twisted in the same direction (cord strength: 90 kg) are arranged at an end count of 22 cords/25 mm, and have a bending resistance of 4.3 gf/mm and an elongation of 0.65%, respectively.

For comparison, a control tire is manufactured with substantially the same construction as in FIG. 6 except that steel cords with layer construction of 1×5×0.23 mm (cord strength: 65 kg) are arranged at an end count of 22 cords/25 mm as a belt. This steel cord has a bending resistance of 7.5 gf/mm and an elongation of 0.35%.

Figure 7:
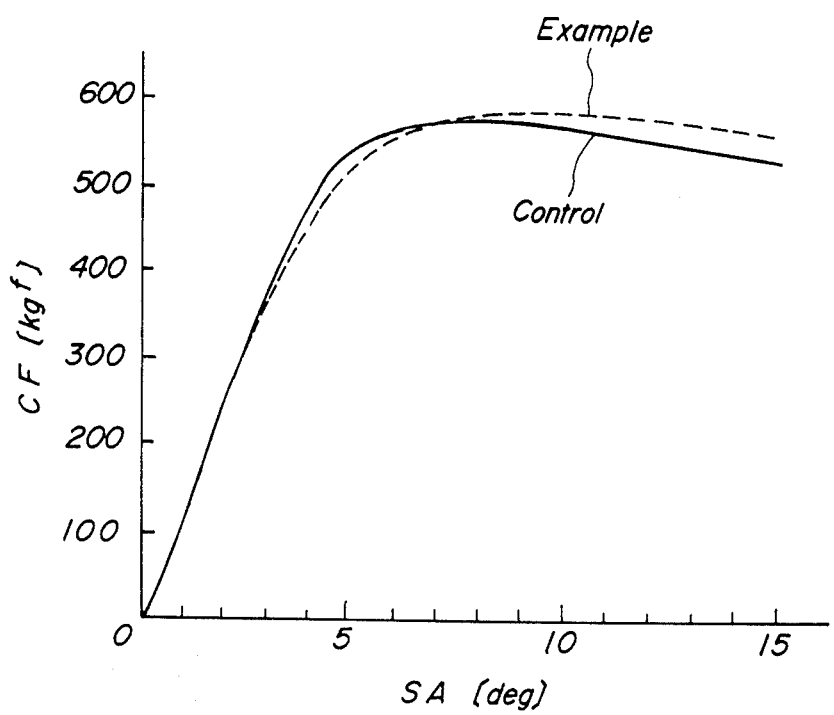
FIG. 7 is a graph showing comparative results on the relation between CF and SA.

After each of these tires is mounted on a normal rim having a width of 6 inches, CF-SA curve is measured under conditions that an internal pressure is 2.0 kg/cm$^2$ and a load is 650 kg to obtain results as shown in FIG. 7, wherein a solid line is the case of the control tire and a broken line is the case of the example tire according to the invention. As apparent from FIG. 7, according to the invention, the attainment to CF max can be delayed to higher SA side while maintaining Cp at substantially the same level.

In the pneumatic tire having the belt reinforcement composed of steel cords, the problem on the cornering stability at large turning angle region is solved according to the invention. In the tire of the invention, the cornering stability over an entire region extending from a small turning angle to a large turning angle can generally be enhanced while maintaining sufficient Cp level up to the middle turning angle region.

What is claimed is:

1. A pneumatic radial tire for use in passenger cars comprising; a carcass as a reinforcement for a tire casing and a belt consisting of two parallel arranged steel belt layers each containing steel cords therein, the cords of which layers being crossed with each other with respect to the mid-circumferential line of the tire, a cap composed of textile cords surrounding an outer periphery of each of at least both side ends of the steel belt layers and optionally a layer composed of textile cords disposed under said cap and surrounding an outer periphery of each of at least both side ends of the steel belt layers, said steel belt layers each composed of a rubberized layer containing flexible and stretchable steel cords of strand construction twisted in the same direction, each cord having a bending resistance with a range of 5 to 1.4 gf/mm as a ratio of load to unit deflection under loading in three-point bending test and an elongation under a load of 3 kgf within a range of 0.5 to 2% in tension test.

2. The pneumatic radial tire according to claim 1, wherein said rubberized layer of steel cords is free at both side ends.

3. The pneumatic radial tire according to claim 1, wherein the textile cord of said cap is nylon cord.

4. The pneumatic radial tire according to claim 1, wherein said belt is substantially parallel to the outer profile of the tread at its radial section.

5. The pneumatic radial tire according to claim 1, wherein said belt has a width substantially equal to the width of ground contact surface of the tread at its radial section.

6. The pneumatic radial tire of claim 1, wherein the textile cords of said optional layer are nylon cords.

7. The pneumatic radial tire of claim 1, wherein the steel cords in each of said steel belt layers comprises a strand construction of 3×7×0.15 arranged at an end count of 22 cords/25 mm.

* * * * *